(12) United States Patent
Konigsburg et al.

(10) Patent No.: US 9,170,920 B2
(45) Date of Patent: *Oct. 27, 2015

(54) IDENTIFYING AND TAGGING BREAKPOINT INSTRUCTIONS FOR FACILITATION OF SOFTWARE DEBUG

(71) Applicant: International Business Machines Corporation, Armonk, NY (US)

(72) Inventors: Brian R. Konigsburg, Austin, TX (US); David S. Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/850,327

(22) Filed: Mar. 26, 2013

(65) Prior Publication Data

US 2014/0298105 A1    Oct. 2, 2014

(51) Int. Cl.
*G06F 11/00* (2006.01)
*G06F 11/36* (2006.01)

(52) U.S. Cl.
CPC .......... *G06F 11/3636* (2013.01); *G06F 11/362* (2013.01)

(58) Field of Classification Search
CPC   G06F 11/362; G06F 11/3636; G06F 11/3664
See application file for complete search history.

(56) References Cited

U.S. PATENT DOCUMENTS 5,881,288 A * 3/1999 Sumi et al. .................... 717/125
5,889,981 A   3/1999 Betker et al.
6,247,146 B1 * 6/2001 Wheatley et al. .......... 714/38.13

2003/0208745 A1 * 11/2003 Bystricky et al. ............. 717/129
2004/0083331 A1 *  4/2004 Gschwind et al. ................ 711/5
(Continued)

FOREIGN PATENT DOCUMENTS

JP          2002333995 A     11/2002

OTHER PUBLICATIONS

IBM TDB and Liu, L. "Predict Instruction Flow Based on Sequential Segments". IP.com PriorArtDatabase. IP.com No. IPCOM000120223D. Original Publication Date: Apr. 1, 1991. Original Disclosure Information: TDB n11 Apr. 1991 p. 66-69. IP.com Electronic Publication: Apr. 2, 2005.

(Continued)

*Primary Examiner* — Yolanda L Wilson
(74) *Attorney, Agent, or Firm* — Jinesh Patel; Steven L. Bennett

(57) ABSTRACT

A processor stores an address of a first instruction of a first instruction set into a first register. The processor determines that a first instruction set location of the first instruction address matches a breakpoint instruction set location of a breakpoint instruction address stored in a second register, wherein the second register includes a state bit. The processor retrieves the first instruction. The processor determines that a breakpoint instruction offset of the breakpoint instruction address identifies the first instruction as the breakpoint. The processor sets the state bit of the second register. The processor removes the first instruction based on the state bit being set and then re-retrieves the first instruction. The processor tags the first instruction and generates an interrupt based on either the tagged first instruction being next to completion or the tagged first instruction being completed.

12 Claims, 3 Drawing Sheets

(56) References Cited

U.S. PATENT DOCUMENTS

| | | | |
|---|---|---|---|
| 2004/0225920 A1* | 11/2004 | Bates et al. | 714/38 |
| 2006/0070039 A1* | 3/2006 | Bates et al. | 717/129 |
| 2007/0006158 A1 | 1/2007 | Takuma et al. | |
| 2008/0168428 A1* | 7/2008 | Bates et al. | 717/129 |
| 2008/0250275 A1* | 10/2008 | Walker et al. | 714/45 |
| 2009/0089547 A1* | 4/2009 | Moyer | 712/205 |
| 2009/0217095 A1* | 8/2009 | Bussa et al. | 714/34 |
| 2013/0263094 A1* | 10/2013 | Bates et al. | 717/129 |
| 2014/0298106 A1* | 10/2014 | Konigsburg et al. | 714/38.13 |

OTHER PUBLICATIONS

"Branch Refetch Direction Cache". IP.com PriorArtDatabase. IP.com No. IPCOM000217765D IP.com Electronic Publication: May 11, 2012.

* cited by examiner

IDENTIFYING AND TAGGING BREAKPOINT INSTRUCTIONS FOR FACILITATION OF SOFTWARE DEBUG

FIELD OF THE INVENTION

The present invention relates generally to instruction fetching, and more particularly to identifying and tagging breakpoint instructions for the purposes of software debugging.

BACKGROUND

Debugging is a methodical process of finding and reducing the number of bugs, or defects, in a computer program or a piece of electronic hardware. Debugging ranges in complexity from fixing simple errors to performing lengthy and tiresome tasks of data collection, analysis, and scheduling updates. The debugging skill of the programmer can be a major factor in the ability to debug a problem, but the difficulty of software debugging varies greatly with the complexity of the system, and also depends to some extent, on the programming language(s) used and the available tools, such as debuggers. Debuggers are software tools which enable the programmer to monitor the execution of a program, stop it, restart it, set breakpoints and change values in memory.

One of the possible debugging tools used by programmers and software engineers is to modify an instruction stream by replacing an instruction with an exception or a branch that allows the debugger to take control of the program. However, for certain debug applications, it is not possible or desirable to modify the instruction stream in this manner. In these cases, programmers may utilize a Completion Instruction Address Breakpoint Register (CIABR). A CIABR allows the debugger to specify an instruction address, which when hit will cause an interrupt that will transfer control to the debugger.

SUMMARY

Embodiments of the present invention provide a method, system and computer program product for identifying and tagging breakpoint instructions. A processor stores an address of a first instruction of a first instruction set into a first register, wherein the first instruction address includes a first instruction set location, and a first instruction offset within the first instruction set. The processor determines that the first instruction set location matches a breakpoint instruction set location of a breakpoint instruction address stored in a breakpoint register, the breakpoint register including a state bit, and the breakpoint instruction address including the breakpoint instruction set location and a breakpoint instruction offset. The processor retrieves the first instruction. The processor determines that the breakpoint instruction offset identifies the first instruction as the breakpoint instruction. The processor sets the state bit of the breakpoint register. The processor removes the first instruction based on the state bit of the breakpoint register being set. The processor re-retrieves the first instruction. The processor tags the first instruction. The processor generates an interrupt based on either the tagged first instruction being next to completion or the tagged first instruction being completed.

DETAILED DESCRIPTION

Figure 1:
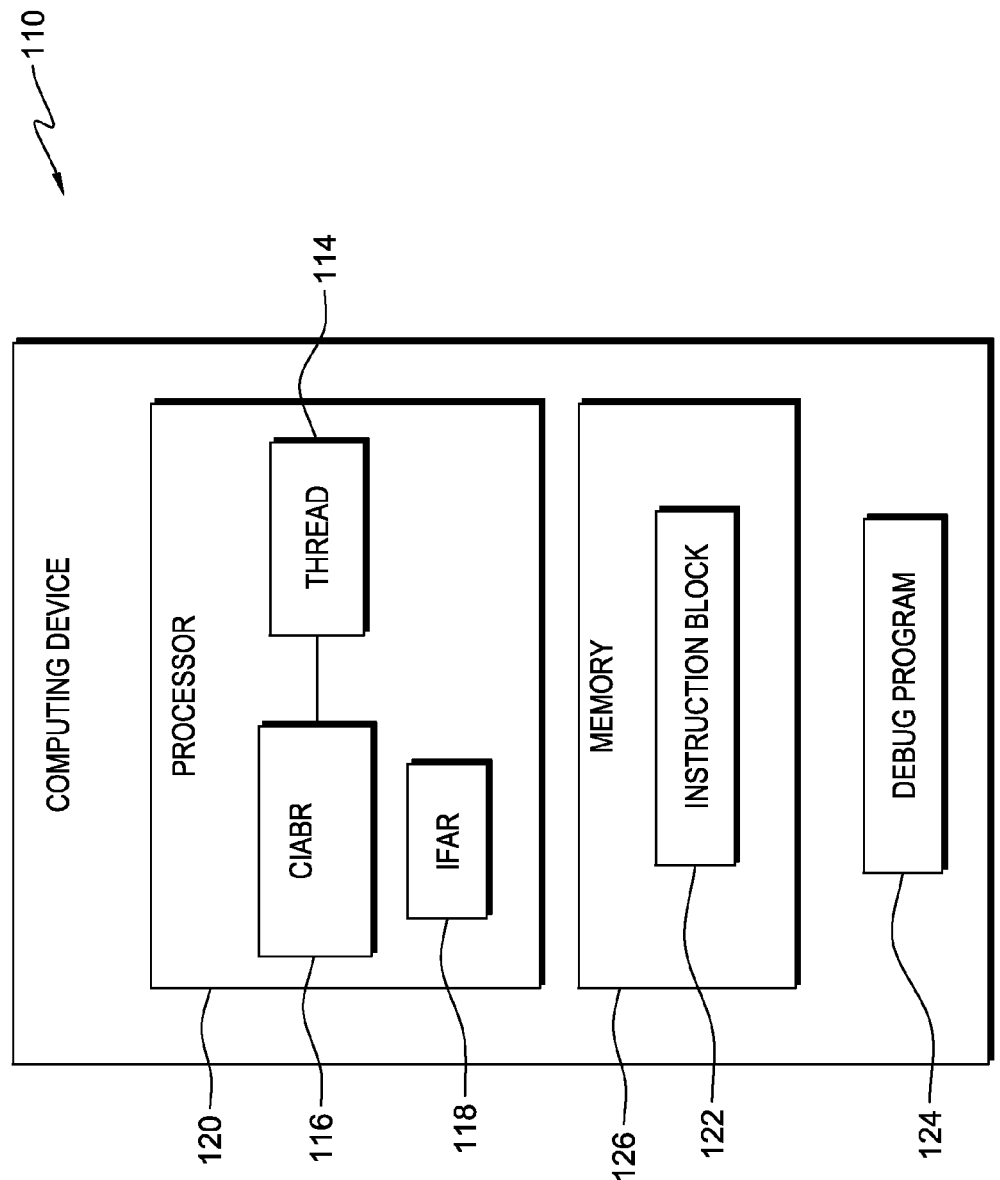
FIG. 1 illustrates a computing system for breakpoint instruction identification, in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

"Any combination of one or more computer-readable medium(s) may be utilized. The computer-readable medium may be a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible hardware medium that can contain, or store a program for use by or in connection with an instruction execution system, apparatus, or device."

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures. Overall, embodiments of the present invention addresses timing issues that may occur with relation to software debug. PowerPC® (PowerPC is a registered trademark of International Business Machines Corporation) has an architecture family in which software can set up a Completion Instruction Address Breakpoint Register (CIABR) which contains a breakpoint instruction address. When the CIABR is enabled and an address of a completing instruction matches the breakpoint instruction address stored in the register, the processor generates a debug interrupt. However, in many cases, there may be timing issues due to the fact that by the time the processor determines that the address of a fetched instruction matches the breakpoint instruction address stored in CIABR, it is too late for the decode logic to be able to tag the instruction as needing an interrupt.

FIG. 1 depicts computing device 110, in accordance with an exemplary embodiment of the invention. In the exemplary embodiment, computing device 110 includes processor 120, memory 126, and debug program 124. Computing device 110 may be a desktop computer, a notebook, a laptop computer, a tablet computer, a handheld device, a smart-phone, a thin client, or any other electronic device or computing system capable of executing program instructions and supporting the functionality required of specific embodiments of the invention. The components of computing device 110 are described in more detail with reference to FIG. 3.

Processor 120 includes CIABR 116, Instruction Fetch Address Register (IFAR) 118, and thread 114. In the exemplary embodiment, processor 120 is a hardware device capable of loading the next instruction address to be fetched into IFAR 118 and comparing instruction addresses loaded in IFAR 118 with instruction addresses stored in CIABR 116.

CIABR 116 is a register of processor 120 dedicated to storing the address of a breakpoint instruction. The term "address" refers to the location where data, in this case, a breakpoint instruction, is stored in memory 126. The term "breakpoint instruction" refers to an instruction which, when completed, is intended to signal an interrupt. The specific instruction chosen to be the breakpoint instruction is left to the discretion of the programmer.

Thread 114 is a hardware component of processor 120 responsible for fetching instructions. In general, hardware threads, such as thread 114, allow for multiple programs to execute concurrently in the processor. In the exemplary embodiment, each thread has a corresponding CIABR. Therefore, in the exemplary embodiment, CIABR 116 is associated with thread 114. In other embodiments, processor 120 can contain multiple threads, each with its own corresponding CIABR.

IFAR 118 is a register of processor 120 dedicated to storing the address of the next instruction to be fetched by thread 114. In other embodiments, in which processor 120 contains multiple threads, IFAR 118 stores the address of the next instruction to be fetched by processor 120 and is not bound to a single thread.

Memory 126 includes instruction block 122 and debug instructions 124. In the exemplary embodiment, memory 126 is a computer readable tangible storage device such as RAM (random access memory). Memory 126 will be described in further detail with regard to FIG. 3.

Instruction block 122 is a set of instructions which, in the exemplary embodiment, contains the breakpoint instruction. In embodiments of the invention, the address of each instruction of instruction block 122 has two components. The first component describes the location of instruction block 122. Specifically, the first component is a sequence of bits corresponding to the location of instruction block 122. The second component describes the location of the specific instruction within instruction block 122. For example, with regard to the first instruction of instruction block 122, the first component is the same for the each address of each instruction within instruction block 122. The second component of the address of the first instruction describes the location of the first instruction within instruction block 122. In the exemplary embodiment, the second component functions as an index of the instructions within instruction block 122, pointing to the specific instruction within instruction block 122, in this case, the first instruction of instruction block 122.

Debug program 124 is software that is dedicated to assisting in determining errors or defects within a program or hardware device of computing device 110. In the exemplary embodiment, debug program 124 is stored on a computer readable tangible storage device in computing device 110, however, in other embodiments, debug program 124 may be stored on an external storage device. In the exemplary embodiment, processor 120 executes debug program 124 once processor 120 executes the breakpoint instruction in instruction block 122 and generates an interrupt. This process is described in further detail with regard to FIG. 2.

Figure 2:
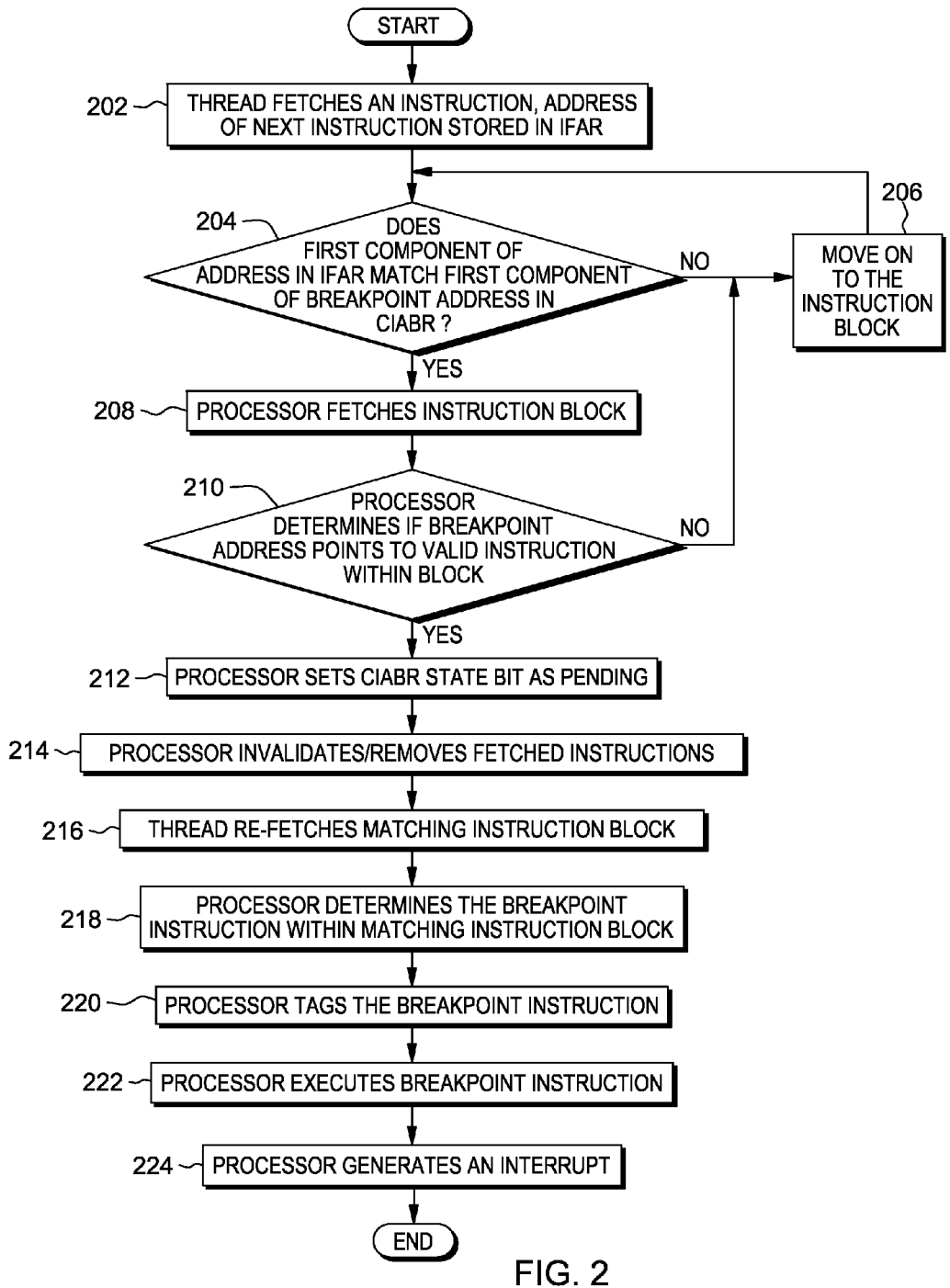
FIG. 2 is a flowchart illustrating the operations of a processor in identifying and tagging a breakpoint instruction, in accordance with an embodiment of the invention.

FIG. 2 is a flowchart illustrating the operation of processor 120 in identifying and tagging a breakpoint instruction, in accordance with an exemplary embodiment of the invention. In an exemplary embodiment, thread 114 fetches an instruction and processor 120 stores the address of the next instruction, which, in the exemplary embodiment, is the first instruction of the next instruction block, instruction block 122, in IFAR 118 (step 202). In other embodiments, processor 120 may store a second, third or any other instruction of instruction block 122 in IFAR 118. As stated above, in embodiments of the invention, the address of each instruction of instruction block 122 has two components. The first component describes the location of instruction block 122 and the second component describes the location of the specific instruction within instruction block 122. For example, with regard to the first instruction of instruction block 122, the first component is the same for the each address of each instruction within instruction block 122. The second component of the address of the first instruction describes the location of the first instruction within instruction block 122. In the embodiments of the invention, the second component functions as an index of the instructions within instruction block 122, pointing to the specific instruction within instruction block 122, in this case, the first instruction of instruction block 122.

Processor 120 then determines if the first component of the address of the first instruction, i.e., the sequence of bits corresponding to the location of instruction block 122, stored in IFAR 118 matches the first component of the breakpoint address stored in CIABR 116 (decision 204). In the exemplary embodiment, the breakpoint address has a first and a second component similar to the instruction addresses for the instructions contained within instruction block 122. The first component describes the location of the instruction block containing the breakpoint instruction and the second component points to the breakpoint instruction within the relevant instruction block using an index-type format. If processor 120 determines that the first component of the address of the first instruction of instruction block 122 does not match the first component of the breakpoint address stored in CIABR 116 (decision 204, "NO" branch), processor 120 fetches instruction block 122 and moves on to the next instruction block (step 206) and determines if the first component of the address of the instruction to be fetched next from the next instruction block matches the first component of the breakpoint address stored in CIABR 116.

If processor 120 determines that the first component of the address of the first instruction of instruction block 122 does match the first component of the breakpoint address stored in CIABR 116 (decision 204, "YES" branch), processor 120 fetches instruction block 122 (step 208). Processor 120 then determines if the second component of the breakpoint address stored in CIABR 116 points to a valid instruction within instruction block 122 (decision 210). In the exemplary embodiment, an instruction from instruction block 122 is valid if the instruction is in line to be executed by processor 120, with regard to the current instruction-fetch cycle(s). For example, if the fourth instruction from an instruction block composed of eight instructions is stored in IFAR by processor 120, when processor 120 fetches instruction block 122, only the fourth, fifth, sixth, seventh and eighth instructions are in line for execution by processor 120 and therefore valid. In addition, with regard to this example, if the fifth instruction is determined by processor 120 to be a predicted taken branch, then only the fourth and fifth instructions are in line for execution by processor 120 and therefore valid. In the exemplary embodiment, a sequence of bits within each instruction, referred to as "valid bits", denotes whether each instruction is valid or invalid.

If processor 120 determines that the second component of the breakpoint address stored in CIABR 116 does not point to a valid instruction within instruction block 122 (decision 210, "NO" branch), processor 120 moves on to the next instruction block (step 206) and determines if the first component of the address of the instruction to be fetched next from the next instruction block matches the first component of the breakpoint address stored in CIABR 116. If processor 120 determines that the second component of the breakpoint address stored in CIABR 116 points to a valid instruction within instruction block 122 (decision 210, "YES" branch), processor 120 sets the CIABR state bit as pending (step 212). In the exemplary embodiment, if the state bit is set to one, it is pending; meaning processor 120 has determined a CIABR match and will identify and tag an instruction within the next instruction block fetched by thread 114, effectively making it the breakpoint instruction.

Processor 120 then invalidates/removes all instructions fetched after the determined CIABR match, including instructions within instruction block 122 that thread 114 has fetched (step 214). Processor 120 invalidates all instructions fetched after the CIABR match to avoid an instruction from another instruction block from being tagged as the breakpoint instruction and also to maintain program order. For example, if processor 120 determines a CIABR match and sets the state bit, processor 120 will tag an instruction within the next instruction block fetched by thread 114. However, if a second instruction block is already fetched and in the pipeline when the state bit is set, processor 120 may tag an instruction in the second instruction block instead of the instruction block which caused the CIABR match, i.e., instruction block 122. To avoid such errors, processor 120 invalidates/removes instructions fetched after the CIABR match has been determined. In addition, processor 120 invalidates/removes instructions fetched after the CIABR match has been determined so that program order can be maintained and instructions fetched after the CIABR match are not fetched prior to the instructions that generated the CIABR match.

Thread 114 then re-fetches instruction block 122 (step 216). Since the state bit of CIABR 116 is pending, processor 120 then identifies the breakpoint instruction within instruction block 122 by examining the second component of the breakpoint address stored in CIABR 116 (step 218). As described above, the second component of the breakpoint address functions as an index for the instructions within the instruction block containing the breakpoint instruction, instruction block 122, pointing to a specific instruction, i.e., the breakpoint instruction.

In the exemplary embodiment, once processor 120 determines a CIABR match, the matching instruction (along with the other instructions in the instruction block and any subsequent fetched instructions) is invalidated and re-fetched as stated above because, assuming a cache hit, by the time processor 120 examines the second component of the breakpoint address stored in CIABR 116, determines a CIABR match, and determines that the breakpoint address stored in CIABR 116 points to a valid instruction within instruction block 122, there may not be enough time for processor 120 to tag the breakpoint instruction. Invalidating and re-fetching the instruction (along with the other instructions in the instruction block and any subsequent fetched instructions) that produces the CIABR match provides extra time so processor 120 can identify the instruction block as containing the breakpoint instruction, determine that the breakpoint address stored in CIABR points to a valid instruction within the identified instruction block, and set the state bit as pending during the initial fetch and then tag the breakpoint instruction within the instruction block on the subsequent fetch. In other embodiments, once processor 120 determines a CIABR match and the matching instruction (along with the other instructions in the instruction block and any subsequent fetched instructions) is invalidated, processor 120 re-fetches starting from the breakpoint instruction rather than re-fetching the entire instruction block. In addition, it is important to note that, if while re-fetching the instructions, an instruction flush occurs, then a new instruction address is loaded into IFAR 118 and processor 120 returns back to step 202.

Processor 120 then tags the breakpoint instruction within instruction block 122, to signal that an interrupt is to be generated after completion of the instruction (step 220). The breakpoint instruction moves down the pipeline and processor 120 executes and completes the breakpoint instruction (step 222). Once processor 120 has completed the breakpoint instruction, processor 120 generates an interrupt (step 224), at which point the interrupt handler takes over and processor 120 executes debug program 124. In other embodiments, processor 120 blocks the breakpoint instruction from completing and generates an interrupt, at which point the interrupt handler takes over and processor 120 executes debug program 124. In further embodiments, processor 120 generates an interrupt when the breakpoint instruction is next to completion.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
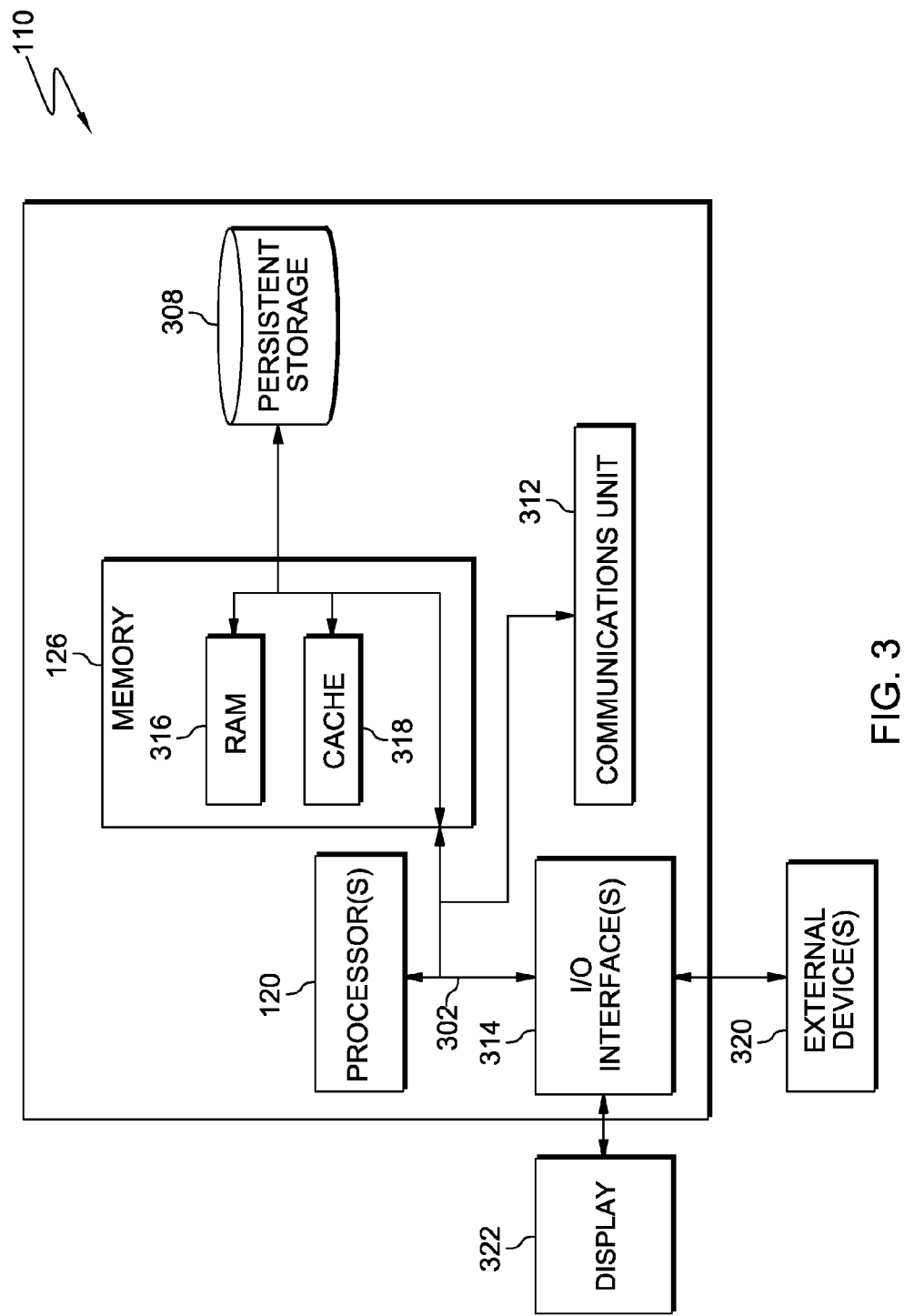
FIG. 3 is a block diagram depicting the hardware components of the breakpoint instruction identification system of FIG. 1, in accordance with an embodiment of the invention.

FIG. 3 depicts a block diagram of components of computing device 110, in accordance with an illustrative embodiment. It should be appreciated that FIG. 3 provides only an illustration of one implementation and does not imply any limitations with regard to the environment in which different embodiments may be implemented. Many modifications to the depicted environment may be made.

Computing device 110 includes communications fabric 302, which provides communications between computer processor(s) 120, memory 126, persistent storage 308, communications unit 312, and input/output (I/O) interface(s) 314.

Memory 126 and persistent storage 308 are examples of computer-readable tangible storage devices and media. Memory 126 may be, for example, one or more random access memories (RAM) 316, cache 318, or any other suitable volatile or non-volatile storage device.

Programs, such as the optimizing software, are stored in persistent storage 308 for execution by one or more of the respective computer processors 120 via one or more memories of memory 126. In the embodiment illustrated in FIG. 4, persistent storage 308 includes flash memory. Alternatively, or in addition to flash memory, persistent storage 308 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 308 may also be removable. For example, a removable hard drive may be used for persistent storage 308. Other examples include an optical or magnetic disk that is inserted into a drive for transfer onto another storage device that is also a part of persistent storage 308, or other removable storage devices such as a thumb drive or smart card.

Communications unit 310, in these examples, provides for communications with other data processing systems or devices. In these examples, communications unit 310 includes one or more network interface cards. Communications unit 310 may provide communications through the use of either or both physical and wireless communications links. Programs, such as the optimizing software, may be downloaded to persistent storage 308 through communications unit 310.

I/O interface(s) 314 allows for input and output of data with other devices that may be connected to computing device 110. For example, I/O interface 314 may provide a connection to external devices 320 such as a keyboard, keypad, a touch screen, and/or some other suitable input device. I/O interface(s) may also connect to display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for identifying and tagging breakpoint instructions, the computer program product comprising:
    one or more computer-readable storage devices and program instructions stored on at least one of the one or more tangible storage devices, the program instructions comprising:
    program instructions to store an address of a first instruction of a first instruction set into a first register, wherein the first instruction address includes a first instruction set location, and a first instruction offset within the first instruction set;
    program instructions to determine that the first instruction set location matches a breakpoint instruction set location of a breakpoint instruction address stored in a breakpoint register, the breakpoint register including a state bit, and the breakpoint instruction address including the breakpoint instruction set location and a breakpoint instruction offset;
    program instructions to retrieve the first instruction;
    program instructions to determine that the breakpoint instruction offset identifies the first instruction as the breakpoint instruction;
    program instructions to set the state bit of the breakpoint register;
    program instructions to remove the first instruction based on the state bit of the breakpoint register being set;
    program instructions to re-retrieve the first instruction;
    program instructions to tag the first instruction; and
    program instructions to generate an interrupt based on either the tagged first instruction being next to completion or the tagged first instruction being completed.

2. The computer program product of claim 1, wherein the first instruction set location identifies the location of the first instruction set and the first instruction offset identifies the location of the first instruction within the first instruction set.

3. The computer program product of claim 1, wherein the breakpoint instruction set location identifies the location of an instruction set that contains the breakpoint instruction and the breakpoint instruction offset identifies the location of the breakpoint instruction within the instruction set that contains the breakpoint instruction.

4. The computer program product of claim 1, further comprising:
 program instructions to retrieve a second instruction of the first instruction set; and
 program instructions to remove the second instruction based on the state bit of the breakpoint register being set.

5. The computer program product of claim 1, further comprising program instructions to generate an interrupt when the tagged first instruction is next to completion.

6. The computer program product of claim 1, further comprising program instructions to generate an interrupt when the tagged first instruction is completed.

7. The computer program product of claim 1, further comprising:
 program instructions to retrieve a third instruction of a second instruction set; and
 program instructions to remove the third instruction based on the state bit of the breakpoint register being set.

8. The computer program product of claim 1, wherein the program instructions to set the state bit comprises program instructions to set the state bit to one.

9. A computer system for identifying and tagging breakpoint instructions, the computer system comprising:
 one or more processors, one or more computer-readable memories, one or more computer-readable tangible storage devices, and program instructions stored on at least one of the one or more storage devices for execution by at least one of the one or more processors via at least one of the one or more memories, the program instructions comprising:
 program instructions to store an address of a first instruction of a first instruction set into a first register, wherein the first instruction address includes a first instruction set location, and a first instruction offset within the first instruction set;
 program instructions to determine that the first instruction set location matches a breakpoint instruction set location of a breakpoint instruction address stored in a breakpoint register, the breakpoint register including a state bit, and the breakpoint instruction address including the breakpoint instruction set location and a breakpoint instruction offset;
 program instructions to retrieve the first instruction;
 program instructions to determine that the breakpoint instruction offset identifies the first instruction as the breakpoint instruction;
 program instructions to set the state bit of the breakpoint register;
 program instructions to remove the first instruction based on the state bit of the breakpoint register being set;
 program instructions to re-retrieve the first instruction;
 program instructions to tag the first instruction; and
 program instructions to generate an interrupt based on either the tagged first instruction being next to completion or the tagged first instruction being completed.

10. The computer system of claim 9, wherein the first instruction set location identifies the location of the first instruction set and the first instruction offset identifies the location of the first instruction within the first instruction set.

11. The computer system of claim 9, wherein the breakpoint instruction set location identifies the location of an instruction set that contains the breakpoint instruction and the breakpoint instruction offset identifies the location of the breakpoint instruction within the instruction set that contains the breakpoint instruction.

12. The computer system of claim 9, further comprising:
 program instructions to retrieve a second instruction of the first instruction set; and
 program instructions to remove the second instruction based on the state bit of the breakpoint register being set.

* * * * *